United States Patent
Anderson et al.

(10) Patent No.: US 10,697,310 B2
(45) Date of Patent: Jun. 30, 2020

(54) MULTIPLE SOURCE IMPINGEMENT BAFFLES FOR GAS TURBINE ENGINE COMPONENTS

(71) Applicant: United Technologies Corporation, Farmington, CT (US)

(72) Inventors: Corey D. Anderson, East Hartford, CT (US); Jeremy Styborski, East Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 156 days.

(21) Appl. No.: 15/982,163

(22) Filed: May 17, 2018

(65) Prior Publication Data

US 2019/0353038 A1  Nov. 21, 2019

(51) Int. Cl.
*F01D 5/18* (2006.01)
*F01D 9/06* (2006.01)

(52) U.S. Cl.
CPC .............. *F01D 5/188* (2013.01); *F01D 5/186* (2013.01); *F01D 5/189* (2013.01); *F01D 9/065* (2013.01); *F05D 2240/126* (2013.01); *F05D 2240/81* (2013.01); *F05D 2260/201* (2013.01); *F05D 2260/202* (2013.01)

(58) Field of Classification Search
CPC .......... F01D 9/065; F01D 5/188; F01D 5/189; F01D 5/186; F05D 2260/201; F05D 2240/81; F05D 2240/126; F05D 2240/121; F05D 2260/202
See application file for complete search history.

(56) References Cited

U.S. PATENT DOCUMENTS 3,628,880 A * 12/1971 Smuland .................. F01D 5/189
  415/175
3,891,348 A *  6/1975 Auxier .................... F01D 5/189
  416/97 R (Continued)

FOREIGN PATENT DOCUMENTS

EP   1852572 A2  11/2007
GB   1467483 A    3/1977

OTHER PUBLICATIONS

European Search Report for European Application No. 19174835.9, International Filing Date May 16, 2019, dated Oct. 15, 2019, 7 pages.

*Primary Examiner* — Christopher Verdier
(74) *Attorney, Agent, or Firm* — Cantor Colburn LLP

(57) ABSTRACT

Partitioned baffles and components for installation within gas turbine engines are provided. The partitioned baffles include a baffle body defining a first cavity, the baffle body having a first inlet and at least one first impingement hole arranged for flow to pass through the first cavity from the first inlet to the at least one first impingement hole and a partitioned channel installed within the baffle body and defining a second cavity, wherein the partitioned channel has a second inlet and at least one second impingement hole, wherein a flow through the second cavity flows from the second inlet to the at least one second impingement hole. The baffle body is configured to receive cooling air from a first source and the partitioned channel is configured to receive cooling air from a second source, wherein the first source is different from the second source.

20 Claims, 9 Drawing Sheets

(56) References Cited

U.S. PATENT DOCUMENTS

| | | | |
|---|---|---|---|
| 4,798,515 A | | 1/1989 | Hsia et al. |
| 5,511,937 A | * | 4/1996 | Papageorgiou ......... F01D 5/189 |
| | | | 415/115 |
| 7,007,488 B2 | | 3/2006 | Orlando et al. |
| 2007/0258811 A1 | * | 11/2007 | Shi ......................... F01D 5/147 |
| | | | 415/210.1 |
| 2011/0123351 A1 | * | 5/2011 | Hada ....................... F01D 5/189 |
| | | | 416/97 R |
| 2017/0234144 A1 | | 8/2017 | Mugglestone |

* cited by examiner

MULTIPLE SOURCE IMPINGEMENT BAFFLES FOR GAS TURBINE ENGINE COMPONENTS

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Cooling air, depending on the airfoil configuration (e.g., blade, vane, etc.) may be supplied from an inner diameter and/or an outer diameter thereof. For example, typically blades are fed cooling air through a platform at an inner diameter thereof. Vanes, however, may be fed cooling air from one or both of the inner and outer diameters. In some arrangements, the platforms of the airfoils may be configured with platform cover plates with impingement holes. The cover plates having impingement holes may be arranged to direct cooling air onto the non-gaspath surfaces of the platform itself, to thus cool the platform.

The cool air may pass through the impingement holes of the cover plate, impinge upon the platform, and then flow into one or more cooling cavities of the airfoil. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling within an airfoil may be desirable.

BRIEF DESCRIPTION

According to some embodiments, partitioned baffles for installation within gas turbine engines are provided. The partitioned baffles include a baffle body defining a first cavity, the baffle body having a first inlet and at least one first impingement hole arranged for flow to pass through the first cavity from the first inlet to the at least one first impingement hole and a partitioned channel installed within the baffle body and defining a second cavity, wherein the partitioned channel has a second inlet and at least one second impingement hole, wherein a flow through the second cavity flows from the second inlet to the at least one second impingement hole. The baffle body is configured to receive cooling air from a first source and the partitioned channel is configured to receive cooling air from a second source, wherein the first source is different from the second source.

In addition to one or more of the features described above, or as an alternative, further embodiments of the partitioned baffles may include at least one support arranged to at least one of support and position the partitioned channel within the baffle body.

In addition to one or more of the features described above, or as an alternative, further embodiments of the partitioned baffles may include that the baffle body has a first end and a second end, wherein the first inlet and the second inlet are located at the first end.

In addition to one or more of the features described above, or as an alternative, further embodiments of the partitioned baffles may include that the baffle body has a first end and a second end, wherein the first inlet is located at the first end and the second inlet is located at the second end.

In addition to one or more of the features described above, or as an alternative, further embodiments of the partitioned baffles may include that the baffle body has a first end and a second end, wherein the first inlet is located at the first end and the baffle body includes a pass-through outlet located at the second end.

In addition to one or more of the features described above, or as an alternative, further embodiments of the partitioned baffles may include that the baffle body and the partitioned channel are integrally formed.

According to some embodiments, components for gas turbine engines are provided. The components include an airfoil body having a leading edge, a trailing edge, a pressure side, and a suction side and a partitioned baffle installed within the airfoil. The partitioned baffle includes a baffle body defining a first cavity, the baffle body having a first inlet and at least one first impingement hole arranged for flow to pass through the first cavity from the first inlet to the at least one first impingement hole and a partitioned channel installed within the baffle body and defining a second cavity, wherein the partitioned channel has a second inlet and at least one second impingement hole, wherein a flow through the second cavity flows from the second inlet to the at least one second impingement hole. The baffle body is configured to receive cooling air from a first source and the partitioned channel is configured to receive cooling air from a second source, wherein the first source is different from the second source.

In addition to one or more of the features described above, or as an alternative, further embodiments of the components may include at least one support arranged to at least one of support and position the partitioned channel within the baffle body.

In addition to one or more of the features described above, or as an alternative, further embodiments of the components may include that the baffle body has a first end and a second end, wherein the first inlet and the second inlet are located at the first end.

In addition to one or more of the features described above, or as an alternative, further embodiments of the components may include that the baffle body has a first end and a second end, wherein the first inlet is located at the first end and the second inlet is located at the second end.

In addition to one or more of the features described above, or as an alternative, further embodiments of the components may include that the baffle body has a first end and a second end, wherein the first inlet is located at the first end and the baffle body includes a pass-through outlet located at the second end.

In addition to one or more of the features described above, or as an alternative, further embodiments of the components may include that the baffle body and the partitioned channel are integrally formed.

In addition to one or more of the features described above, or as an alternative, further embodiments of the components may include that the at least one first impingement hole and the at least one second impingement hole are arranged proximate the leading edge of the airfoil.

In addition to one or more of the features described above, or as an alternative, further embodiments of the components may include that the at least one second impingement hole is arranged proximate a hot spot of the airfoil body.

In addition to one or more of the features described above, or as an alternative, further embodiments of the components may include a platform and a cover plate, wherein the first source is a platform cavity defined between the platform and the cover plate.

According to some embodiments, gas turbine engines are provided. The gas turbine engines include a combustor section, a compressor section, and a turbine section downstream from the combustor section. The turbine section includes at least one component having a platform, an airfoil body extending from the platform and having a leading edge, a trailing edge, a pressure side, and a suction side, and a partitioned baffle installed within the airfoil. The partitioned baffle includes a baffle body defining a first cavity, the baffle body having a first inlet and at least one first impingement hole arranged for flow to pass through the first cavity from the first inlet to the at least one first impingement hole and a partitioned channel installed within the baffle body and defining a second cavity, wherein the partitioned channel has a second inlet and at least one second impingement hole, wherein a flow through the second cavity flows from the second inlet to the at least one second impingement hole. The baffle body is configured to receive cooling air from a first source and the partitioned channel is configured to receive cooling air from a second source, wherein the first source is different from the second source.

In addition to one or more of the features described above, or as an alternative, further embodiments of the gas turbine engines may include that the at least one second impingement hole is arranged proximate a hot spot of the airfoil body.

In addition to one or more of the features described above, or as an alternative, further embodiments of the gas turbine engines may include a platform and a cover plate, wherein the first source is a platform cavity defined between the platform and the cover plate.

In addition to one or more of the features described above, or as an alternative, further embodiments of the gas turbine engines may include that the first source is at an outer diameter location relative to the component, and the second source is at an inner diameter location relative to the component.

In addition to one or more of the features described above, or as an alternative, further embodiments of the gas turbine engines may include that the baffle body has a first end and a second end, wherein the first inlet and the second inlet are located at the first end.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
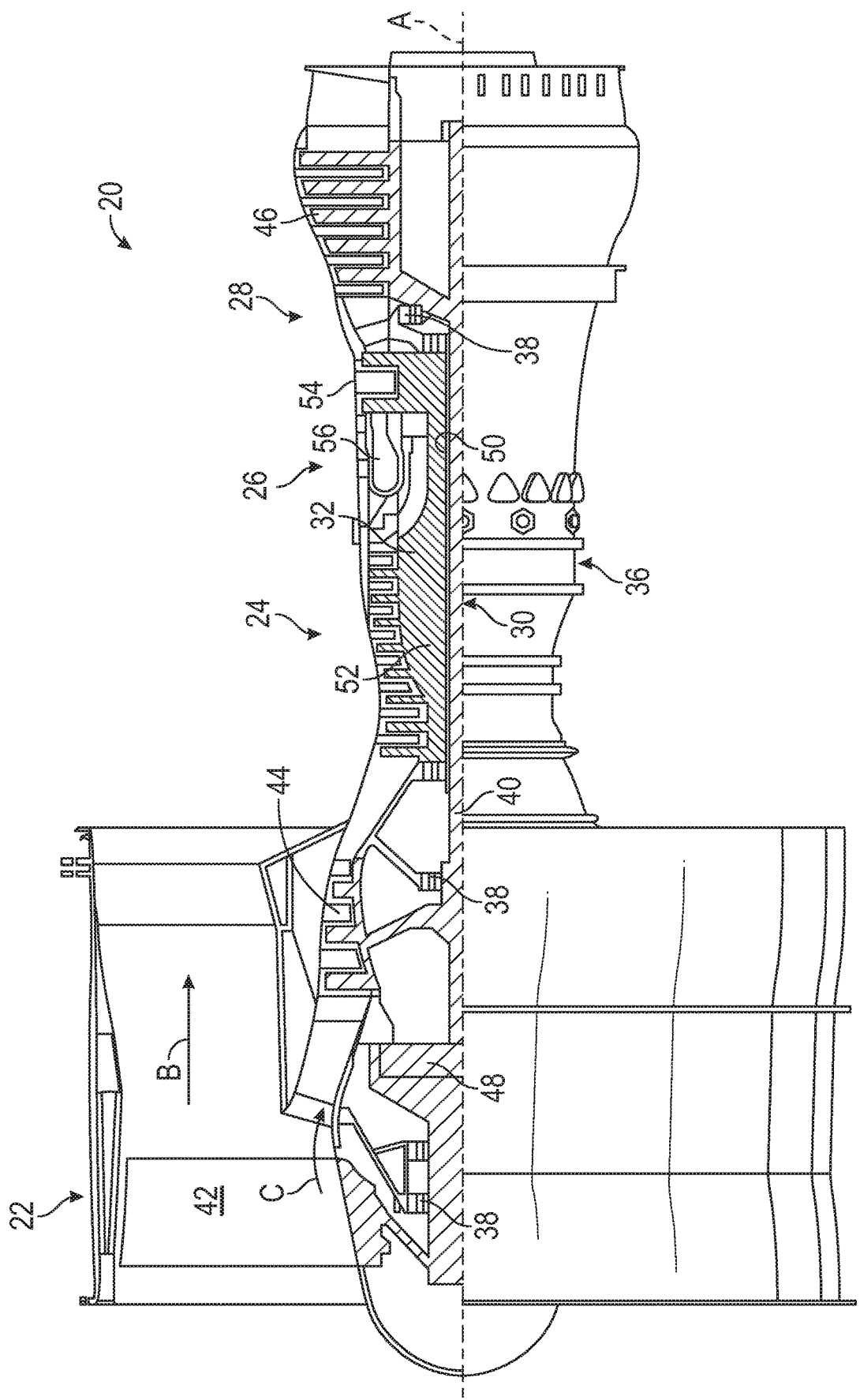
FIG. 1 is a schematic cross-sectional illustration of a gas turbine engine that may incorporate embodiments of the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a gear system 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one non-limiting example is a high-bypass geared aircraft engine. In a further non-limiting example, the engine 20 bypass ratio is greater than about six (6), with an example embodiment being greater than about ten (10), the gear system is an epicyclic gear train, such as a planetary gear system or other gear system 48, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The gear system 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
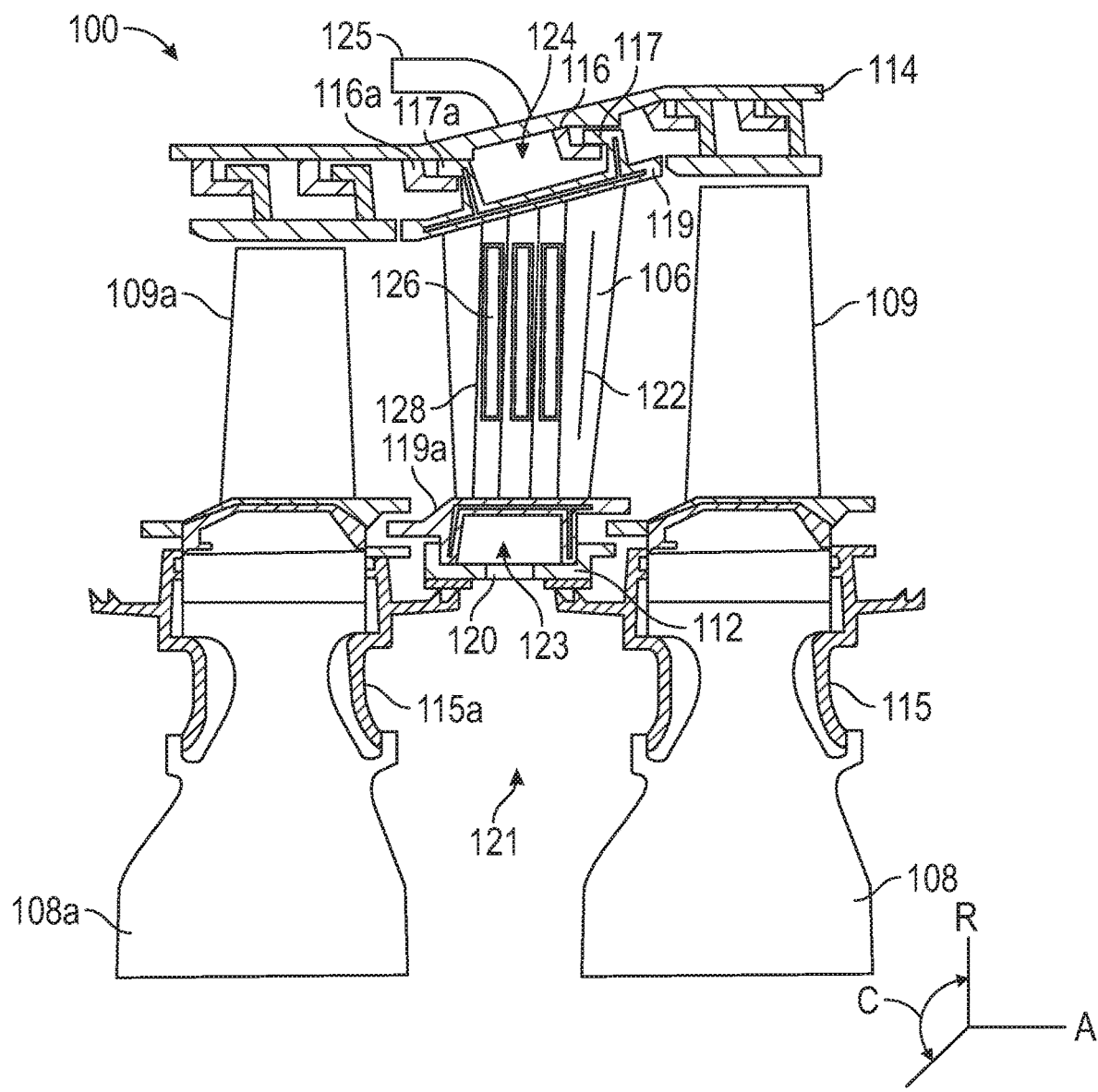
FIG. 2 is a schematic illustration of a portion of a turbine section of a gas turbine engine that may incorporate embodiments of the present disclosure.

Referring now to FIG. 2, a cooling design in a turbine section 28 for a gas turbine engine 20 may utilize a vane 106 disposed between axially adjacent bladed full hoop disks 108, 108*a* having respective blades 109, 109*a*. As shown, vane 106 is disposed radially between an inner air seal 112 and a full hoop case 114 on an outer side. Inner air seal 112 may be a full hoop structure supported by opposing vanes, including a plurality of vanes 106 that are separated in a circumferential direction. Vane 106 is supported by the full hoop case 114 through segmented vane hooks 117, 117*a*. One or more full hoop cover plates 115, 115*a* may minimize leakage between the vane 106 and the blades 109, 109*a*. The vane 106 is radially supported by the full hoop case 114 with segmented case hooks 116, 116*a* in mechanical connection with the segmented vane hooks 117, 117*a*. The vane 106 may be circumferentially supported between circumferentially adjacent platforms 119, 119*a* which may include feather seals that can minimize leakage between the adjacent vanes 106 into the gas path.

A turbine cooling air (TCA) conduit 125 provides cooling air into an outer diameter vane cavity 124 defined in part by an outer platform 119 and the full hoop case 114. The vane 106 is hollow so that air can travel radially into and longitudinally downstream from the outer diameter vane cavity 124, through the vane 106 via one or more vane cavities 122, and into a vane inner diameter cavity 123. The vane inner diameter cavity 123 is defined, in part, by an inner platform 119*a*. Thereafter air may travel through an orifice 120 in the inner air seal 112 and into a rotor cavity 121. Accordingly, cooling air for at least portions of the vane 106 will flow from a platform region, into the vane, and then out of the vane and into another platform region and/or into a hot gaspath/main gaspath. In some arrangements, the platforms 119, 119*a* can include ejection holes to enable some or all of the air to be injected into the main gaspath.

It is to be appreciated that the longitudinal orientation of vane 106 is illustrated in a radial direction, but other orientations for vane 106 are within the scope of the disclosure. In such alternate vane orientations, fluid such as cooling air can flow into the vane cavity 122 through an upstream opening illustrated herein as outer diameter cavity 124 and out through a downstream opening in vane cavity 122 illustrated herein as inner diameter cavity 123. A longitudinal span of vane cavity 122 being between such openings.

The vane 106, as shown, includes one or more baffles 126 located within the vane 106. The baffles 126 are positioned within one or more respective baffle cavities 128. The baffle cavities 128 are sub-portions or sub-cavities of the vane cavity 122. In some embodiments, such as shown in FIG. 2, the baffle cavities 128 are internal cavities that are axially inward from the leading and trailing edges of the vane 106, although such arrangement is not to be limiting.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

In a conventional vane design, often the cooling air to be utilized on a platform is ejected into the main gas path through film cooling holes directly on the exterior gaspath surface of the inner diameter and/or outer diameter vane platform(s). In contrast, in accordance with some embodiments provided herein, cooling air at or from the platform may be used for cooling both the platform and the main body of the airfoil. In some such embodiments, the platform cooling air may still be used for film cooling, wherein after passing through an impingement plate, some of the flow may be directed through platform film holes, and some of the flow may be directed into cavities of an airfoil. In accordance with some embodiments, the cooling air will flow from the platform area/cavity into a radially extending airfoil cavity. In cooling design configurations where the same coolant flow is utilized to cool the inner diameter and/or the outer diameter platforms and the airfoil exterior hot walls, it may be necessary to provide convective cooling along platform surfaces that are immediately adjacent to both the airfoil pressure and suction side surfaces. In this scenario, platform cooling air flow may be "drawn" from various opposing and non-opposing directions in order to provide the necessary cooling airflow required to adequately cool the vane airfoil pressure side and suction side surfaces, as well as, the vane airfoil leading and trailing edge surfaces.

Figure 3A:
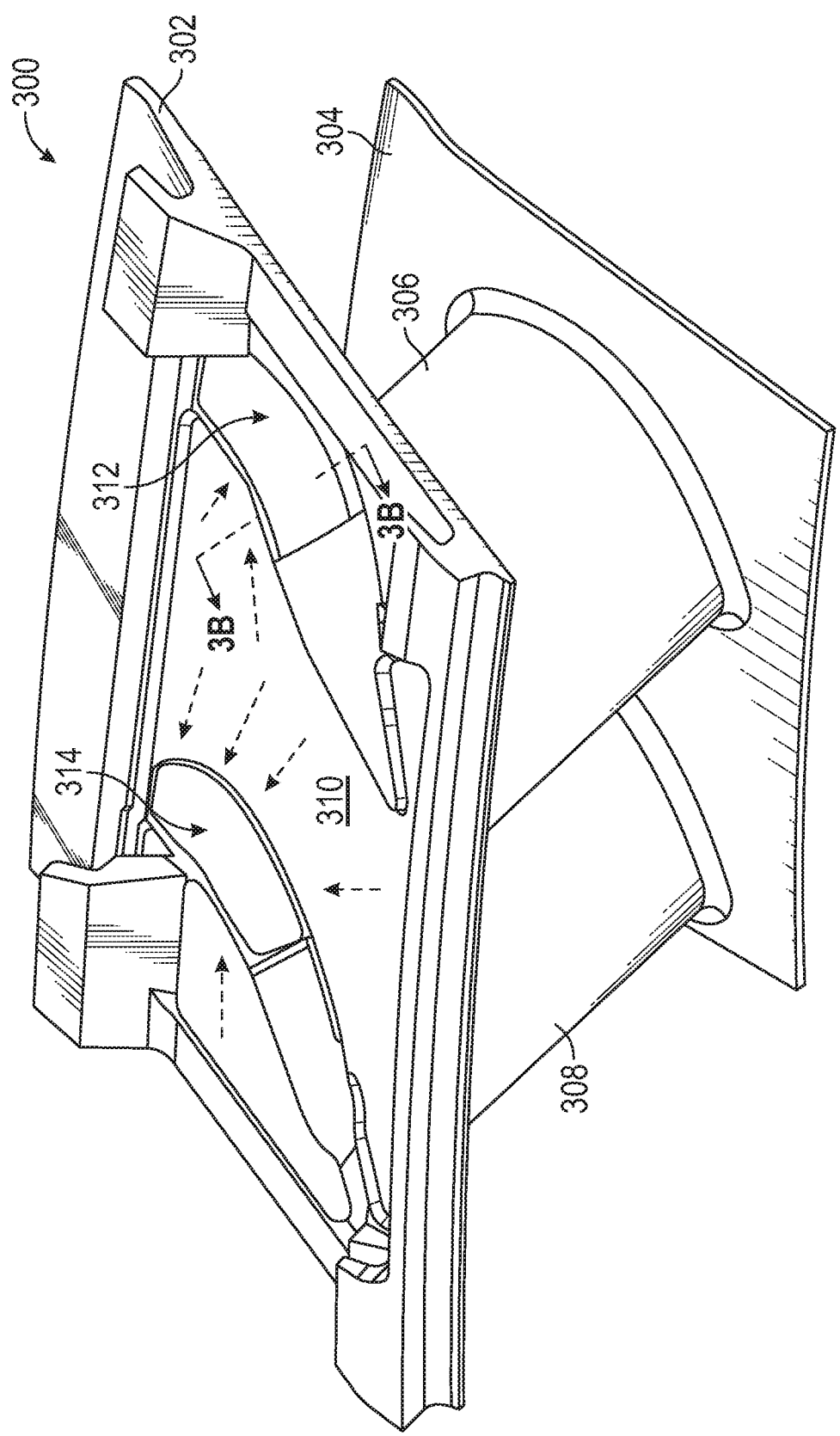
FIG. 3A is a schematic illustration of a component of a gas turbine engine that may incorporate embodiments of the present disclosure.
Figure 3B:
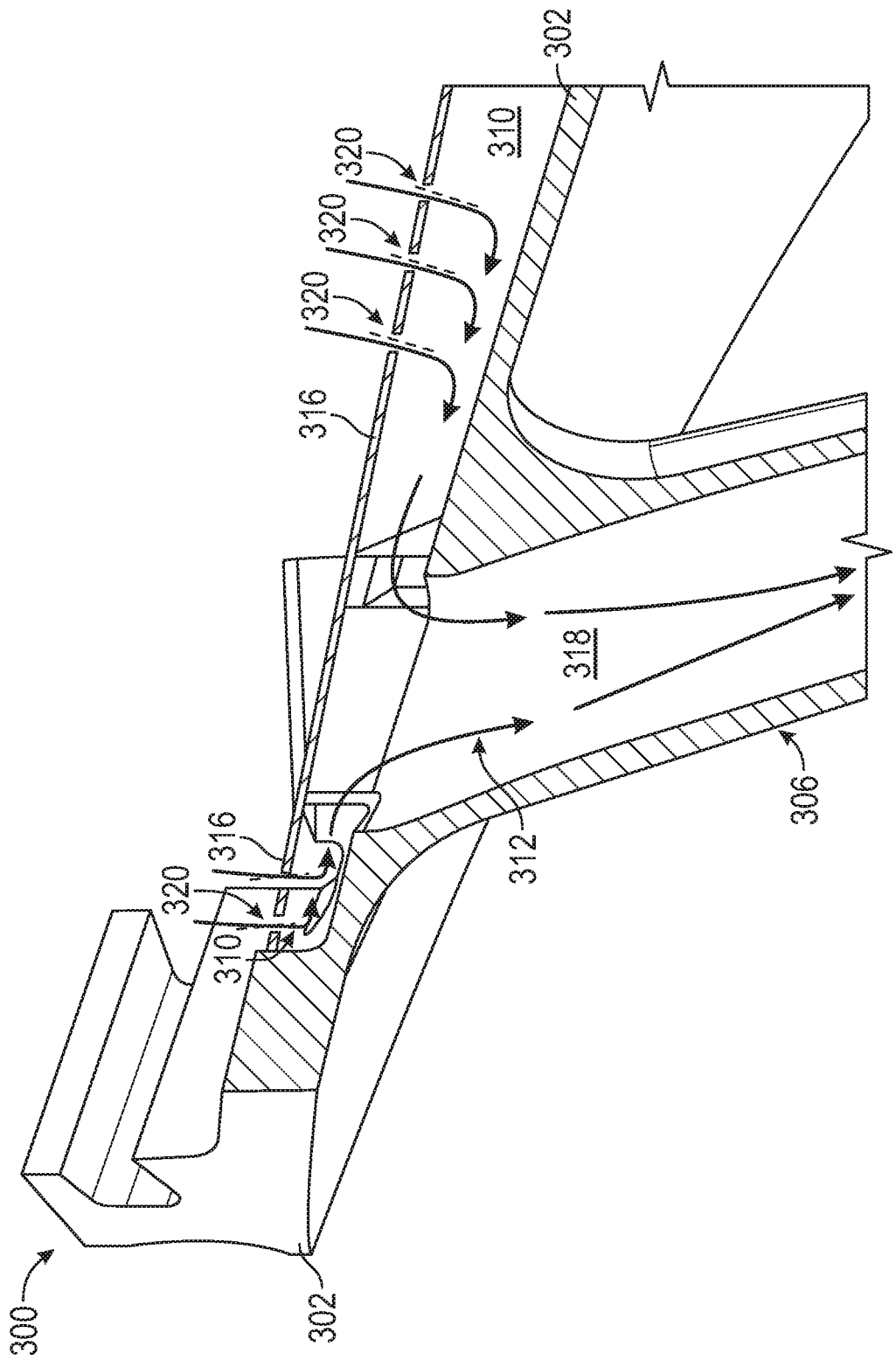
FIG. 3B is a side view of an airfoil and platform of the component of FIG. 3A having a cover plate installed to the platform, as viewed along the line 3B-3B.

Turning to FIGS. 3A-3B, a gas turbine engine component 300 is schematically shown, with FIG. 3A being an isometric view thereof and FIG. 3B being a side, cross-sectional view of the component 300 with a cover plate installed as viewed along the line 3B-3B. The gas turbine engine component 300 includes a first platform 302 and a second platform 304. Extending between the first and second platforms 302, 304 are a first airfoil 306 and a second airfoil 308. The gas turbine engine component 300, as shown, forms a portion of a vane section that can be installed in a turbine section of a gas turbine engine (e.g., as shown and describe above).

As shown in FIG. 3A, the airfoils 306, 308 include a plurality of airfoil cavities, which are open to and in fluid communication with a platform space or platform cavity 310. In FIG. 3A, the platform cavity 310 is formed between the illustrated surface of the first platform 302 and a cover plate (as shown in FIG. 3B). Those of skill in the art will appreciate that use of cover plates on platforms to form the platform cavities, and the cover plate is not shown for clarity and simplicity of illustration. Accordingly, as will be appreciated by those of skill in the art, a platform cavity is a cavity or volume that is formed between a surface of a platform on a side opposite a main, hot gaspath of the platform (i.e., a backside surface of the platform) and a cover plate that is installed to the platform. The platform cavity in operation will act as a cooling air channel that is formed between the cover plate and the backside of the platform surface which creates a conduit for cooling air to be transferred across the cold side of platform surfaces to provide convective cooling.

The cover plate may include one or more inlet apertures, such as impingement holes, that are arranged to provide impingement cooling to the cold side surface of the platform and flow through the platform cavity.

The cooling air within the platform cavity is fed into inlets of a vane airfoil to provide cooling within the vanes, as appreciated by those of skill in the art. Such inlets can be provided at both inner and outer diameter platforms of the airfoil (e.g., first and second platforms 302, 304) and thus cooling air can be provided from one or more opposing platform cavities. Those of skill in the art will appreciate that the cover plates can include a single inlet feed for cooling air or may include multiple impingement holes (e.g., an array).

As shown in FIG. 3A, the first airfoil 306 includes respective airfoil cavity inlet 312 and the second airfoil 308 includes respective airfoil cavity inlet 314. The airfoil cavity inlets 312, 314 are inlets to internal airfoil cavities that, in some arrangements, extend from the first platform 302, through the respective airfoil 306, 308, and to the second platform 304, thus providing a cooling flow path through the respective airfoil 306, 308. In some arrangements, the airfoils 306, 308 are integrally formed with the platforms 302, 304 and in other arrangements, the airfoils 306, 308 can be separately formed and subsequently attached to the platforms 302, 304. Air within the platform cavity 310 (between the first platform 302 and a cover plate) can be fed into the airfoil cavity inlets 312, 314. In typical airfoil/platform arrangements, the cooling air within the platform cavity 310 will enter the airfoil cavity inlets 312, 314 from any/all directions, thus causing cooling flow efficiency issues (e.g., due to turbulent interactions). In some airfoil/platform arrangements, multiple platform sub-cavities can be formed between adjacent airfoils (e.g., between first and second airfoil 306, 308) along the backside of the first platform 302. In some such arrangements, the cooling air from two platform sub-cavities will flow toward each other at the airfoil cavity inlets 312, 314. A schematic illustration of airflow from the platform cavity 310 flowing toward the airfoil cavity inlets 312, 314 in opposing directions is shown by the dashed arrows of FIG. 3A.

Turning now to FIG. 3B, a side view illustration of the gas turbine engine component 300 having a cover plate 316 installed to the first platform 302 is shown. The cover plate 316, when installed to the first platform 302, defines the platform cavity 310 between the structure of the first platform 302 and the cover plate 316, as shown. FIG. 3B also illustrates the flow direction of cooling air flowing through the cover plate 316 and into an airfoil cavity 318 of the first airfoil 306. As shown, the first airfoil 306 is integrally formed with the platform 302. The airfoil cavity 318 is fluidly connected to the platform cavity 310 through the airfoil cavity inlet 312 of the first airfoil 306.

The cover plate 316, as shown, includes a plurality of cooling holes 320 (e.g., holes, apertures, slots, impingement holes, etc.) that enable a cooling flow to enter the platform cavity 310. A cooling flow enters the platform cavity 310 through the cooling holes 320 and travels along a surface of the platform 302 and into the airfoil cavity 318. Although shown in FIG. 3B with the use of an arrangement of multiple cooling holes 320 formed in the cover plate 316, those of skill in the art will appreciate that other arrangements (e.g., single feed port) can be used without departing from the scope of the present disclosure.

As shown in FIG. 3B, airflow into the airfoil cavity 318 is sourced from two opposing sides at the airfoil cavity inlet 312. As will be appreciated when viewing FIG. 3A, such cooling air may be sourced from any direction, mix, and enter the respective airfoil cavity inlets 312, 314. In some embodiments, the use of baffles may provide for improved or optimized cooling schemes (e.g., as shown in FIG. 2). In some embodiments a single baffle may be employed for an entire span of an airfoil (or span a large section of the airfoil), such as from leading edge to trailing edge. However, such baffles typically cannot be optimized for the different cooling requirements of the airfoil, such as at the outer diameter, along the pressure and suction sides, and/or at the leading edge. Certain portions of the airfoil may require increased cooling due to higher heat loads applied thereto (e.g., at the leading edge, outer diameter portion). To account for this, multiple source-multiple cooling region baffles may be employed, wherein the baffle defines multiple internal cavities to direct some air to a first location or portion of an airfoil and direct some air to one or more other locations or portions of the airfoil.

For example, the leading edge of airfoils may experience a high degree of heat load due to the stagnation of gaspath air on the outside (thus increasing heat transfer into the part) and high radius of curvature that makes backside cooling in these regions difficult. Even with significant cooling, it will be appreciated by those of skill in that art that a life limiting location of an airfoil is often at the leading edge. Gaspath temperature profiles vary from engine to engine, but are often peaked at distinct radial locations resulting in radially localized hotspots along the leading edge (or other surfaces) of an airfoil. In these hotspots, the metal temperature of the airfoil is higher, and part-life may be more challenged.

Baffles are commonly used in cooled airfoil design. Baffles are often used to provide backside impingement cooling to the leading edge and/or other locations/surfaces of airfoils. In traditional designs, the baffle defines a single interior cavity with a single source, such that a single source of air is used to provide cooling air to the entire interior surface of the airfoil that is treated by air from the baffle. Accordingly, to address localized hotspots, impingement hole size and density of a baffle may be changed to provide some optimization of the cooling scheme, but the ability to optimize a baffle cooling scheme may be limited due to the fact that the source air is the same (i.e., a single temperature and pressure source is employed).

Accordingly, embodiments of the present disclosure are directed to multiple source baffles. For example, in accordance with some embodiments, an advanced baffle is provided that that allows for two distinct sources of air to be used to provide separate, radially segregated, impingement cooling to an airfoil. In one such example, a baffle may be arranged with a first baffle inlet and a second baffle inlet. The first and second baffle inlets may be sourced with different air to provide optimized cooling schemes to an airfoil. For example, directed cooling may be provided to localized hotspots to provide optimized cooling to thus improve part-life. Air from a second source, flowing through the second baffle inlet, may be relatively cool air with relatively high pressure and may be directed through a partitioned channel to provide local or spot cooling (e.g., at localized hot spots of an airfoil). The partitioned channel is arranged and configured to impinge the cool, high pressure flow from the second source at one or more specific locations (e.g., radial location) where localized hot spots may exist on the airfoil (e.g., where the gaspath temperature profile peaks). A first source may be relatively less cool and lower pressure air (as compared to that of the second source) that is more akin to traditional baffle design cooling schemes. The first source air may be directed and used where the gaspath temperature profile is not peaked and cooling demands are not as high.

By using the partitioned baffles of the present disclosure, more and/or optimized cooling air can be supplied to hotspot locations, thus reducing part metal temperatures. Accordingly, advantageously, for example, part life may be improved and/or an improvement in engine performance may be achieved through reduction in overall cooling flow to the airfoil.

Figure 4B:
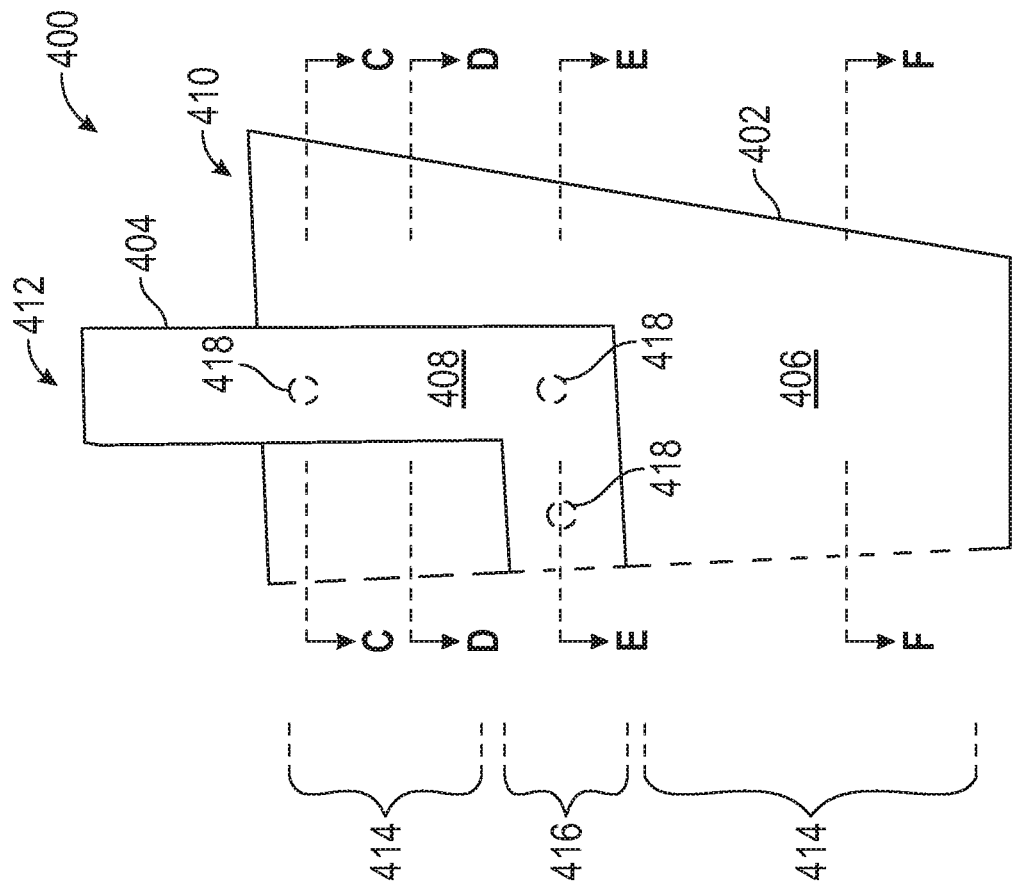
FIG. 4B is a cross-sectional illustration of the partitioned baffle of FIG. 4A as viewed along the line B-B of FIG. 4A.
Figure 4A:
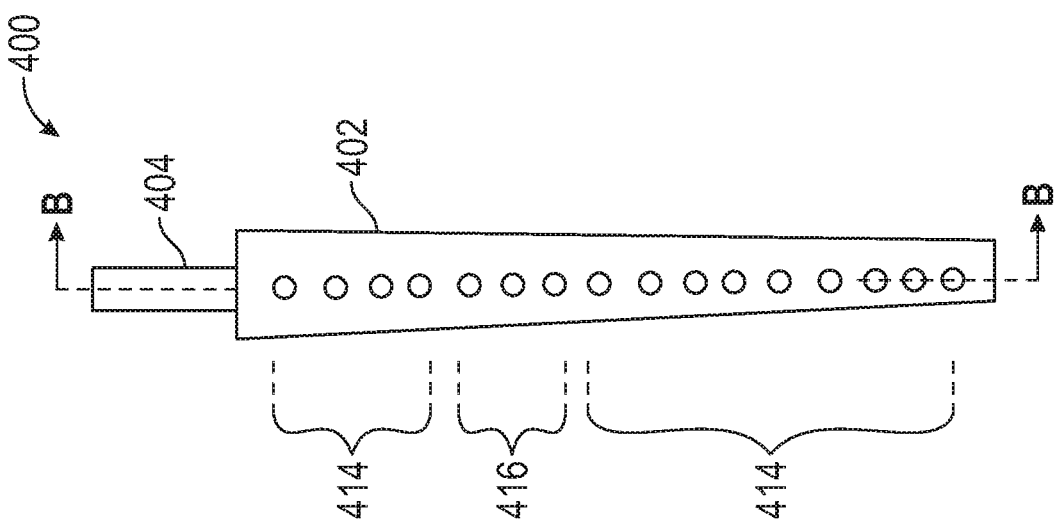
FIG. 4A is a front elevation illustration of a partitioned baffle in accordance with an embodiment of the present disclosure.
Figure 4C:
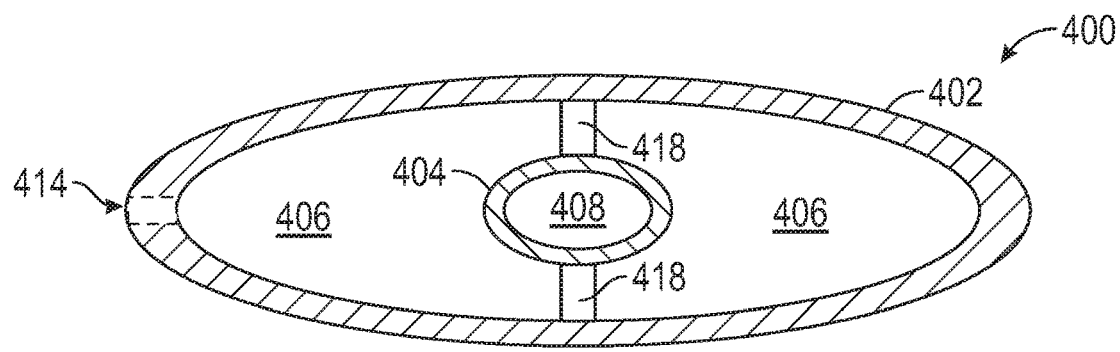
FIG. 4C is a cross-sectional plan view of the partitioned baffle of FIG. 4A as viewed along the line C-C of FIG. 4B.
Figure 4D:
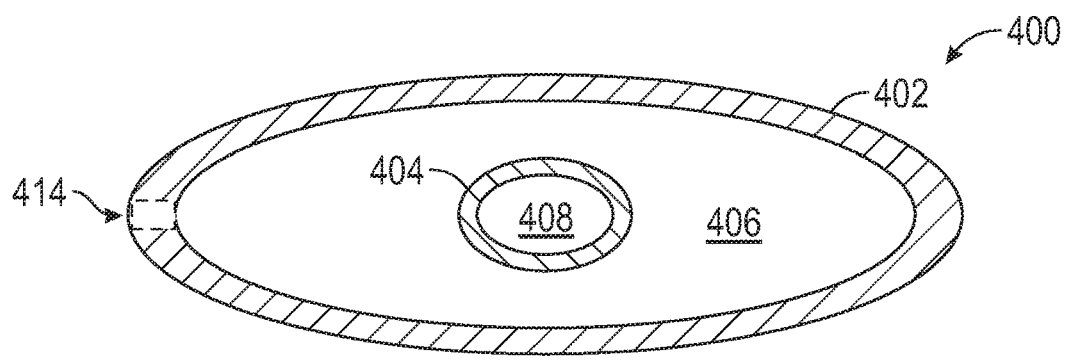
FIG. 4D is a cross-sectional plan view of the partitioned baffle of FIG. 4A as viewed along the line D-D of FIG. 4B.
Figure 4E:
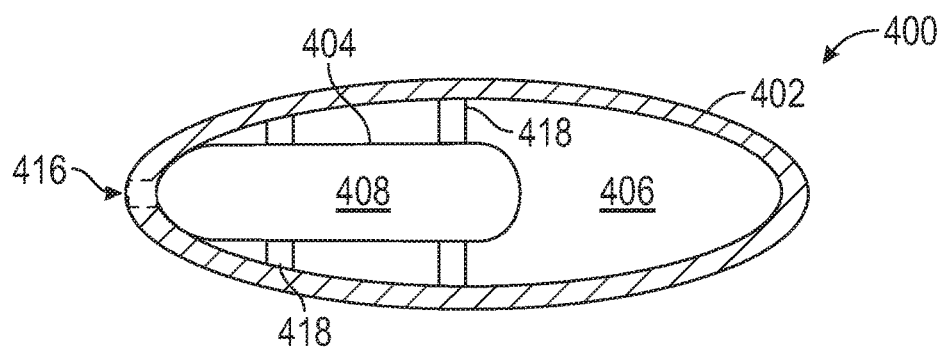
FIG. 4E is a cross-sectional plan view of the partitioned baffle of FIG. 4A as viewed along the line E-E of FIG. 4B.
Figure 4F:
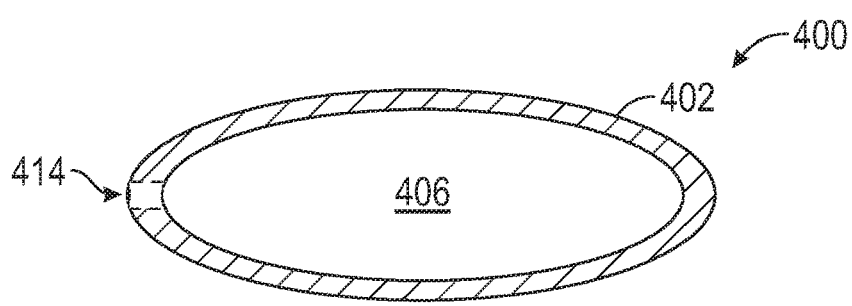
FIG. 4F is a cross-sectional plan view of the partitioned baffle of FIG. 4A as viewed along the line F-F of FIG. 4B.

Turning now to FIGS. 4A-4F, schematic illustrations of a partitioned baffle 400 in accordance with a non-limiting embodiment of the present disclosure is shown. FIG. 4A is a front elevation illustration of the partitioned baffle 400. FIG. 4B is a cross-sectional illustration of the partitioned baffle 400 as viewed along the line B-B of FIG. 4A. FIG. 4C is a cross-sectional plan view of the partitioned baffle 400 as viewed along the line C-C of FIG. 4B. FIG. 4D is a cross-sectional plan view of the partitioned baffle 400 as viewed along the line D-D of FIG. 4B. FIG. 4E is a cross-sectional plan view of the partitioned baffle 400 as viewed along the line E-E of FIG. 4B. FIG. 4F is a cross-sectional plan view of the partitioned baffle 400 as viewed along the line F-F of FIG. 4B.

The partitioned baffle 400 includes baffle body 402 with a partitioned channel 404 installed within the baffle body 402. The baffle body 402 defines a first cavity 406 and the partitioned channel 404 defines a second cavity 408. The first cavity 406 may be a main body cavity that is supplied with cooling air from a first source and the second cavity 408 may be a partitioned cavity that is supplied with cooling air from a second source. In some embodiments, the first cavity 406 may be fluidly separate from the second cavity 408. In some embodiments, the partitioned channel 404 may be a metal conduit or other tube-like structure that is installed, formed, or otherwise attached or manufactured to define a separate (second) cavity from a main body cavity of the baffle body 402.

The first cavity 406 is supplied with cooling air through a first inlet 410 and the second cavity 408 is supplied with cooling air through a second inlet 412. As such, the first inlet 410 may be fluidly connected to a first source and the second inlet 412 may be fluidly connected to a second source. In accordance with embodiments of the present disclosure, the first source and the second source may be different cool air sources.

The first cavity 406 defines a fluid path for cooling air from the first source to flow through the first inlet 410, through the first cavity 406, and out through one or more first impingement holes 414. The second cavity 408 defines a fluid path for cooling air from the second source to flow through the second inlet 412, through the second cavity 408, and out through one or more second impingement holes 416. The second impingement holes 416 may be arranged or positioned to direct cool air from the second source to a specific location or locations on an airfoil to provide increased cooling, such as localized hot spots on a leading edge of an airfoil. The first impingement holes 414 span a portion of the baffle body 402 to direct air from within the first cavity 406 to cool parts of an airfoil.

As shown in FIGS. 4B, 4C, 4E, the partitioned channel 404 is attached or installed within the first cavity 406 and to the baffle body 402 by one or more supports 418. The supports 418 may be integrally formed with the partitioned channel 404, with the baffle body 402, or may be separate elements that are affixed to one or both of the partitioned channel 404 and the baffle body 402, such as by welding, adhesives, pressure-fit between the two elements, etc.

In some embodiments, the bottom of the of baffle body 402 may be solid, such that all the air entering the first cavity 406 will flow through the first impingement holes 414. However, in alternative embodiments, the base or bottom of the baffle body (opposite the first inlet 410) may have a pass-through outlet.

Figure 5:
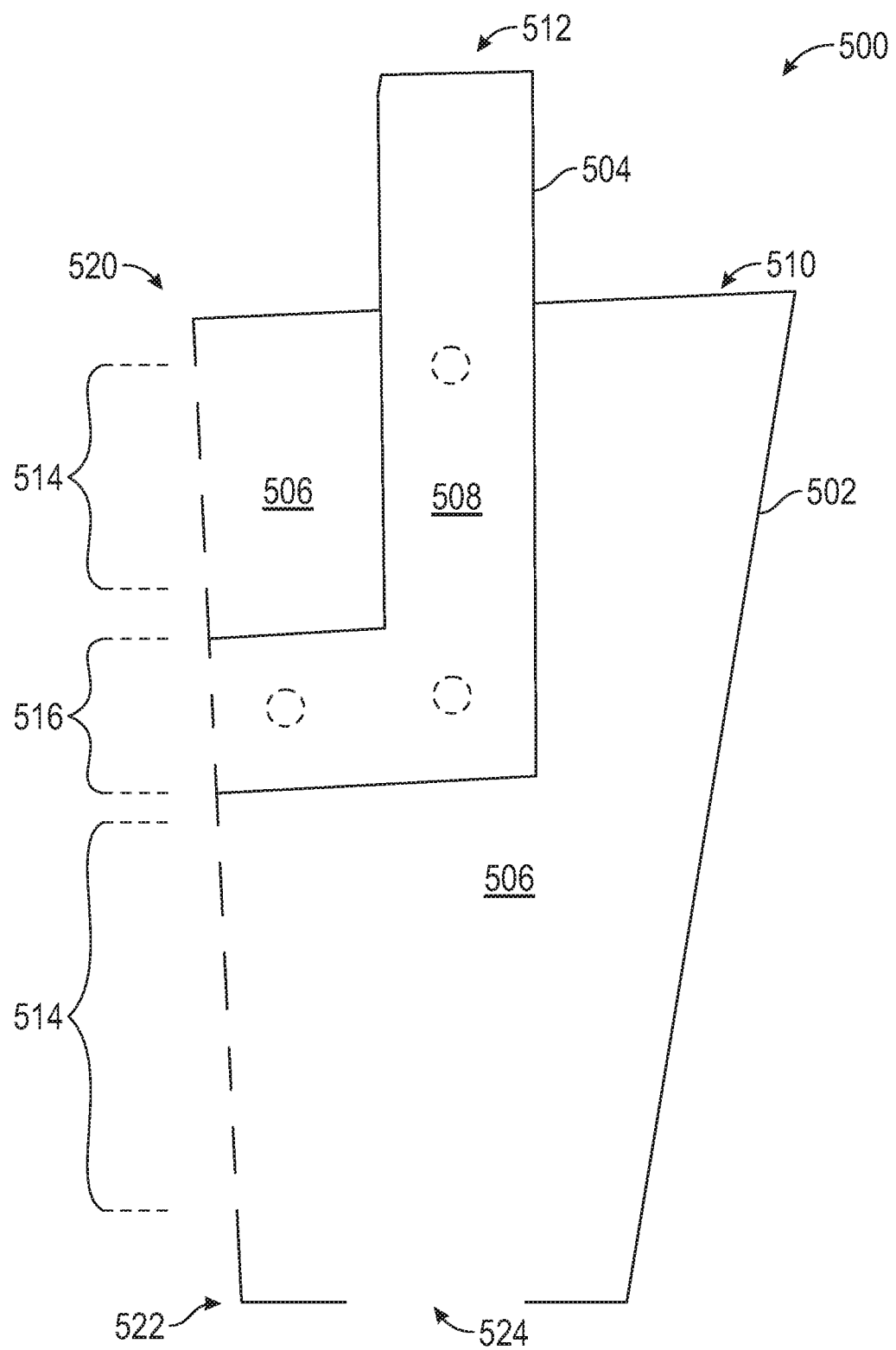
FIG. 5 is a schematic illustration of a partitioned baffle in accordance with an embodiment of the present disclosure.

For example, turning to FIG. 5, a schematic illustration of a partitioned baffle 500 in accordance with a non-limiting embodiment of the present disclosure is shown. The partitioned baffle 500 is similar to that shown and described above with respect to FIGS. 4A-4F, and thus similar features may not be described in detail again. The partitioned baffle 500 includes a baffle body 502 with a partitioned channel 504 installed therein. The baffle body 502 defines a first cavity 506 and the partitioned channel 504 defines a second cavity 508. The first cavity 506 fluidly extends between a first inlet 510 and one or more first impingement holes 514. The second cavity 508 is defined within the partitioned channel 504 and fluidly extends between a second inlet 512 and one or more second impingement holes 516.

As shown, the first inlet 510 of the first cavity 506 is located at a first end 520 of the baffle body 502. A pass-through outlet 524 may be arranged at a second end 522 of the baffle body 502. The pass-through outlet 524 may be provided to allow a portion of the cooling air within the first cavity 506 to flow radially through the baffle body 502 (i.e., from the first inlet 510 to the pass-through outlet 524).

Figure 6:
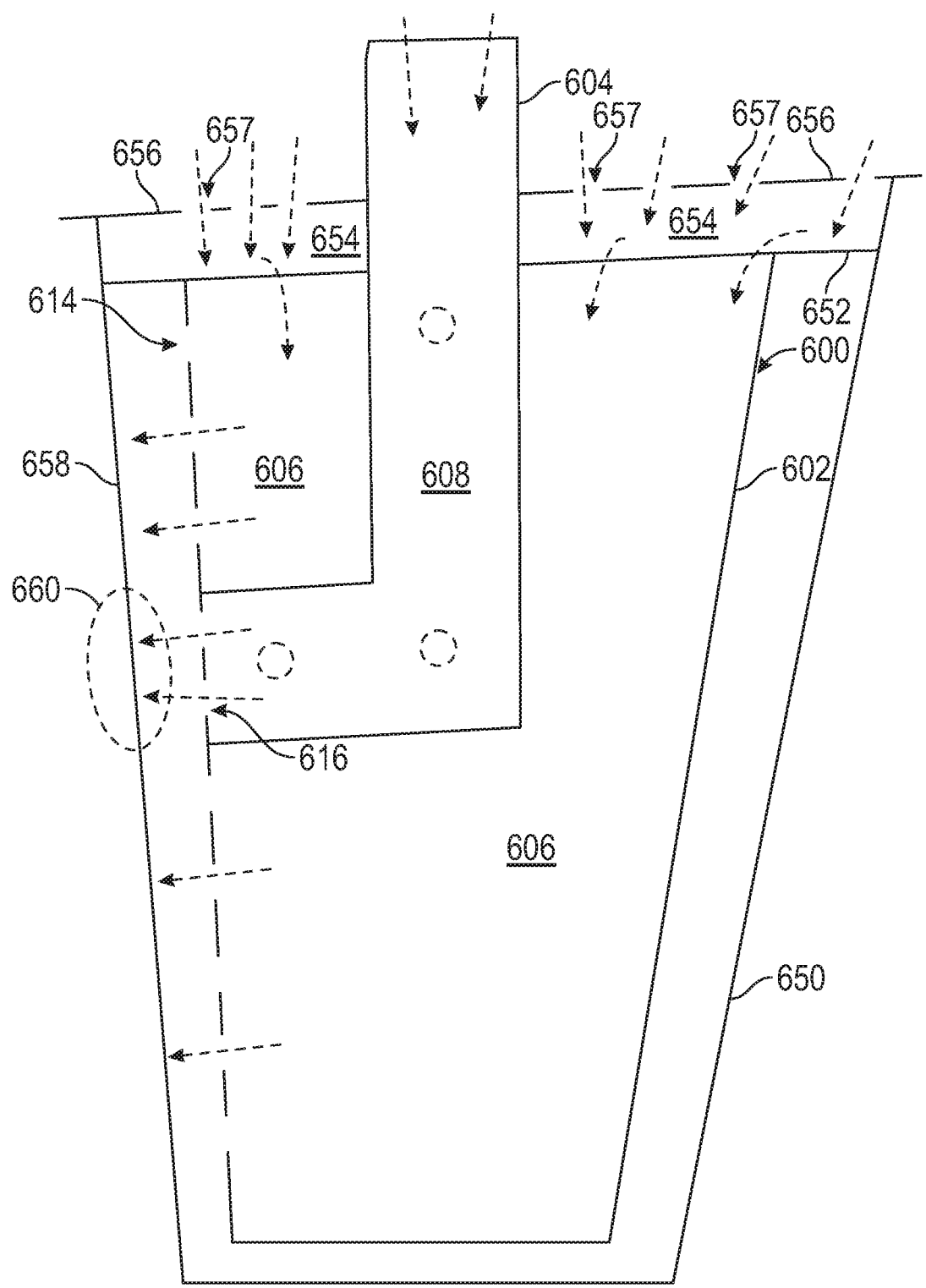
FIG. 6 is a schematic illustration of a partitioned baffle in accordance with an embodiment of the present disclosure as installed in an airfoil.

Turning now to FIG. 6, a schematic illustration of a partitioned baffle 600 installed within an airfoil 650 in accordance with a non-limiting embodiment of the present disclosure is shown. The partitioned baffle 600 is similar to that shown and described above with respect to FIGS. 4A-4F, and thus similar features may not be described in detail again. The partitioned baffle 600 includes a baffle body 602 with a partitioned channel 604 installed therein. The baffle body 602 defines a first cavity 606 and the partitioned channel 604 defines a second cavity 608. The first cavity 606 fluidly extends between a first inlet and one or more first impingement holes 614, as shown and described above. The second cavity 608 is defined within the partitioned channel 604 and fluidly extends between a second inlet and one or more second impingement holes 616, as shown and described above.

As shown, the airfoil 650 extends from a platform 652 with a platform cavity 654 defined between the platform 652 and a cover plate 656. The airfoil 650 has a leading edge 658 that may be impacted by hot gaspath air during operation of a gas turbine engine. The leading edge 658 may have a localized hot spot 660 which may require increased cooling. As such, the partitioned channel 604 is arranged to direct a cooling flow directly to the hot spot 660 through the one or more second impingement holes 616. For other regions or areas of the leading edge 658, the one or more first impingement holes 614 are arranged to direct cooling air from the first cavity 606 onto the leading edge 658. The cooling air supplied into the first cavity 606 is sourced from the platform cavity 654 and thus may be relatively warm due to heat pick-up at the platform 652. The cover plate 656 includes a plurality of platform impingement holes 657 that are arranged to supply impinging cooling air onto the surfaces of the platform 652. The impinging air, from the platform impingement holes 657, will fill the platform cavity 654 and flow into the airfoil (e.g., into the first cavity 606). The platform cavity 654 thus forms a first source of cooling air. In contrast, relatively cool air can be supplied into and through the partitioned channel 604 such that no additional heat pick-up occurs, and thus maintaining relatively low temperatures, and higher pressure. This cooling air may be sourced from a second source that is different from the first source. The cooling air within the partitioned channel 604 may be directed through the second impingement holes 616 to impingement upon the hot spot 660 of the leading edge 658.

Although shown and described above with the first and second inlets being at the same end of the partitioned baffle, in some embodiments, this may not be the case. That is, in some embodiments, the first inlet and the second inlet may be arranged at opposite ends of the baffle.

Figure 7:
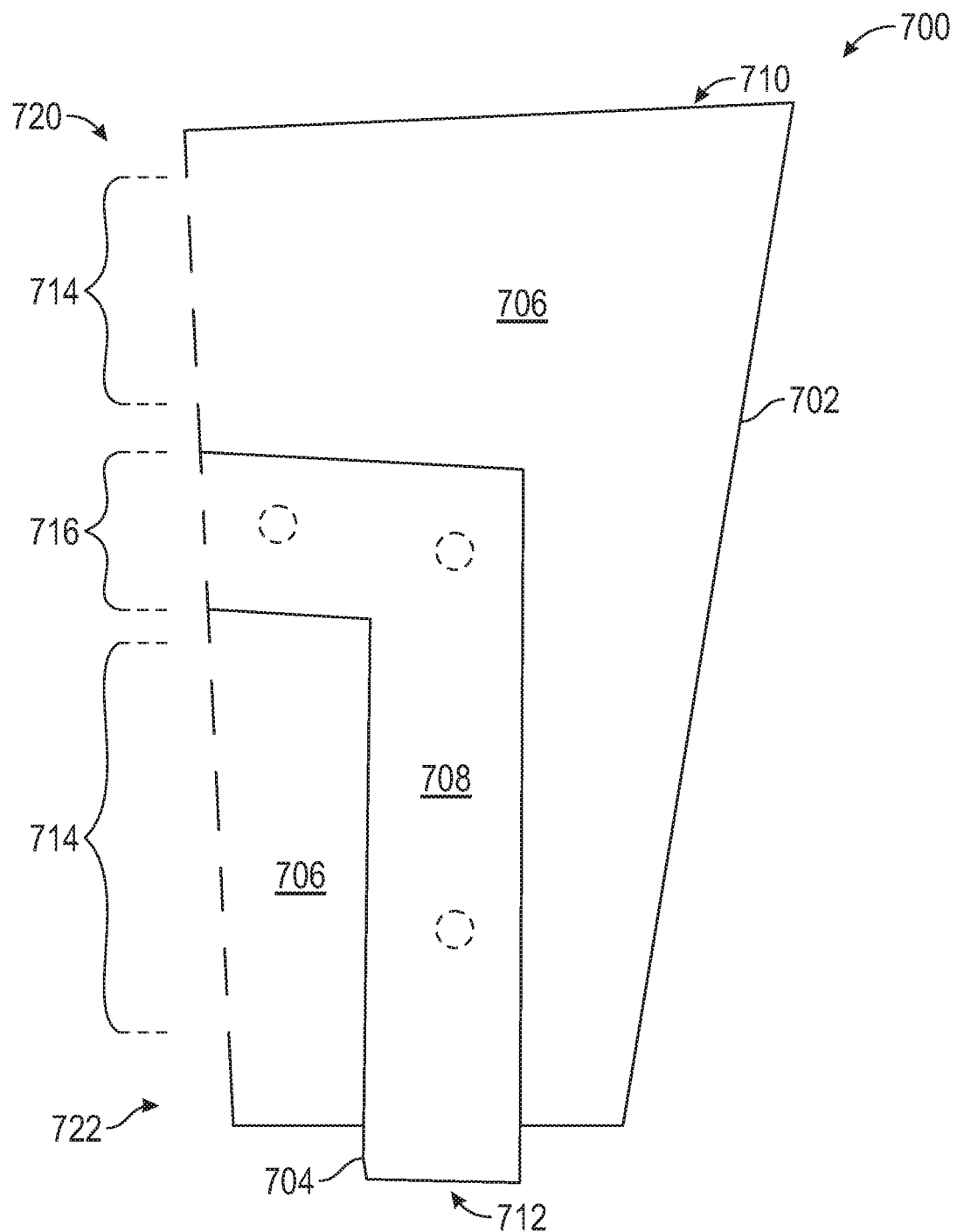
FIG. 7 is a schematic illustration of a partitioned baffle in accordance with an embodiment of the present disclosure

For example, turning to FIG. 7, a schematic illustration of a partitioned baffle 700 in accordance with a non-limiting embodiment of the present disclosure is shown. The partitioned baffle 700 is similar to that shown and described above and thus similar features may not be described in detail again. The partitioned baffle 700 includes a baffle body 702 with a partitioned channel 704 installed therein. The baffle body 702 defines a first cavity 706 and the partitioned channel 704 defines a second cavity 708. The first cavity 706 fluidly extends between a first inlet 710, at a first end 720, and one or more first impingement holes 714. The second cavity 708 is defined within the partitioned channel 704 and fluidly extends between a second inlet 712, at a second end 722, and one or more second impingement holes 716.

As such, a first source of cooling air that supplies air into the first cavity 706 may be fluidly connected at the first end 720 of the baffle body 702. Further, a second source of cooling air that supplies air into the second cavity 708 may be fluidly connected to the partitioned channel 704 at the second end of the baffle body 702.

In an alternative embodiment, both the first and second cavities may be sourced from first and second sources located at the second end (e.g., an inboard, radially inward, or inner diameter location).

Although shown and described with the first source of air being from a platform cavity and a second source of air being above the platform cavity (i.e., above a cover plate), various other sources may be employed without departing from the scope of the present disclosure. Various sources of cooling air may include, without limitation, cooling air from a compressor (not cooled through a heat exchanger) and flow from a compressor that is cooled through a heat exchanger, flow through a platform cover plate and flow that bypasses the cover plate, flow sent through platform cores and flow directly entering the airfoil from the outer diameter or the inner diameter, and/or one flow source at the inner diameter and one flow source at the outer diameter. In one non-limiting example, one source of cooling air may be from flow that is put through a heat exchanger to cool the flow (e.g., second source)) and the other source has not (or it has, but it was first used to cool something else, so it is 'dirty' air) (e.g., first source). The "dirty" air may be used to provide general cooling and the cooled, heat exchanger air may be used at specific locations for spot-cooling.

Further, although shown and described with the partitioned channel directed to the leading edge, and all impingement holes located along the leading edge of the airfoil in the above shown embodiments, such configuration is not to be limiting, but rather is provided for illustrative and explanatory purposes. That is, the partitioned channel may be arranged to direct relatively cool, relative high pressure air to any desired location on an airfoil. For example, the radial position along the leading edge may be selected to achieve a desired cooling scheme. Further, the span range, number, size, orientation, geometry, etc. of the impingement holes of the first and second impingement holes may be customized to achieve a desired cooling scheme.

Moreover, the shape, geometry, and/or location of the supports that position and/or hold the partitioned channel within the baffle body may be optimized to impact weight cooling flow in the first cavity, or for other reasons. Further, the baffle body and/or the partitioned channel may be inserted into the airfoil or baffle body, respectively, from either the outer diameter or the inner diameter, depending on the specific configuration employed.

By employing partitioned baffles of the present disclosure, the amount of flow required for cooling of the airfoil may be reduced, improving engine performance, or the amount of flow may be maintained to improve part life, or some combination of the two scenarios. In one test of such a partitioned baffle, the arrangement provided for a reduced metal temperature of about 50° F. at the location of the hot spot. In contrast, to meet the same results without a partitioned baffle as described herein, the number of holes at the hotspot location (e.g., radial span location) required double the number of impingement holes, requiring a 20% increase in flow through the airfoils.

Advantageously, embodiments provided herein are directed to optimizing airfoil cooling. For example, optimized airfoil cooling can be achieved using a partitioned baffle as shown and described herein, wherein directed cooling can be provided to hot spots, while more efficient (e.g., less total flow) may be employed for locations not as impacted by hot spots. Further, advantageously, embodiments provided herein can enable reduced metal temperatures of airfoils, which may in turn improve part life and/or provide an improvement in engine performance through a reduction in overall cooling flow to the airfoil.

In accordance with an example embodiment of the present disclosure, airfoil cooling air is separated into two distinct cavities. The separate cavities feed two distinct locations on an airfoil. Because the two cooling flows are segregated, impingement cooling can be optimized at various locations of the airfoil (e.g., hotspots). By using a segregated or divided baffle as described herein, the surfaces of an airfoil may be cooled using optimized flow (e.g., temperature and/or pressure).

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A partitioned baffle for installation within a gas turbine engine, the partitioned baffle comprising:
    a baffle body defining a first cavity, the baffle body having a first inlet and at least one first impingement hole arranged for flow to pass through the first cavity from the first inlet to the at least one first impingement hole; and
    a partitioned channel installed within the first cavity of the baffle body and defining a second cavity that is fluidly separate from the first cavity, wherein the partitioned channel has a second inlet and at least one second impingement hole, wherein a flow through the second cavity flows from the second inlet to the at least one second impingement hole,
    wherein the baffle body is configured to receive cooling air from a first source and the partitioned channel is configured to receive cooling air from a second source, wherein the first source is different from the second source, and
    wherein each of the at least one first impingement hole and the at least one second impingement hole are configured to direct impingement air upon a leading edge of an airfoil body when installed within the airfoil body.

2. The partitioned baffle of claim 1, further comprising at least one support arranged to at least one of support and position the partitioned channel within the baffle body.

3. The partitioned baffle of claim 1, wherein the baffle body has a first end and a second end, wherein the first inlet and the second inlet are located at the first end.

4. The partitioned baffle of claim 1, wherein the baffle body has a first end and a second end, wherein the first inlet is located at the first end and the second inlet is located at the second end.

5. The partitioned baffle of claim 1, wherein the baffle body has a first end and a second end, wherein the first inlet is located at the first end and the baffle body includes a pass-through outlet located at the second end.

6. The partitioned baffle of claim 1, wherein the baffle body and the partitioned channel are integrally formed.

7. A component for a gas turbine engine, the component comprising:
    an airfoil body having a leading edge, a trailing edge, a pressure side, and a suction side; and
    a partitioned baffle installed within the airfoil body, the partitioned baffle comprising:
    a baffle body defining a first cavity, the baffle body having a first inlet and at least one first impingement hole arranged for flow to pass through the first cavity from the first inlet to the at least one first impingement hole; and
    a partitioned channel installed within the first cavity of the baffle body and defining a second cavity that is fluidly separate from the first cavity, wherein the partitioned channel has a second inlet and at least one second impingement hole, wherein a flow through the second cavity flows from the second inlet to the at least one second impingement hole, wherein the baffle body is configured to receive cooling air from a first source and the partitioned channel is configured to receive cooling air from a second source, wherein the first source is different from the second source, and wherein each of the at least one first impingement hole and the at least one second impingement hole are configured to direct impingement air upon the leading edge of the airfoil body.

8. The component of claim 7, further comprising at least one support arranged to at least one of support and position the partitioned channel within the baffle body.

9. The component of claim 7, wherein the baffle body has a first end and a second end, wherein the first inlet and the second inlet are located at the first end.

10. The component of claim 7, wherein the baffle body has a first end and a second end, wherein the first inlet is located at the first end and the second inlet is located at the second end.

11. The component of claim 7, wherein the baffle body has a first end and a second end, wherein the first inlet is located at the first end and the baffle body includes a pass-through outlet located at the second end.

12. The component of claim 7, wherein the baffle body and the partitioned channel are integrally formed.

13. The component of claim 7, wherein the at least one first impingement hole and the at least one second impingement hole are arranged proximate the leading edge of the airfoil body.

14. The component of claim 7, wherein the at least one second impingement hole is arranged proximate a hot spot of the airfoil body.

15. The component of claim 7, further comprising a platform and a cover plate, wherein the first source is a platform cavity defined between the platform and the cover plate.

16. A gas turbine engine comprising:
a combustor section;
a compressor section; and
a turbine section downstream from the combustor section, the turbine section comprising at least one component, wherein the at least one component comprises:
a platform;
an airfoil body extending from the platform and having a leading edge, a trailing edge, a pressure side, and a suction side; and
a partitioned baffle installed within the airfoil body, the partitioned baffle comprising:
a baffle body defining a first cavity, the baffle body having a first inlet and at least one first impingement hole arranged for flow to pass through the first cavity from the first inlet to the at least one first impingement hole; and
a partitioned channel installed within the first cavity of the baffle body and defining a second cavity that is fluidly separate from the first cavity, wherein the partitioned channel has a second inlet and at least one second impingement hole, wherein a flow through the second cavity flows from the second inlet to the at least one second impingement hole, wherein the baffle body is configured to receive cooling air from a first source and the partitioned channel is configured to receive cooling air from a second source, wherein the first source is different from the second source, and wherein each of the at least one first impingement hole and the at least one second impingement hole are configured to direct impingement air upon the leading edge of the airfoil body.

17. The gas turbine engine of claim 16, wherein the at least one second impingement hole is arranged proximate a hot spot of the airfoil body.

18. The gas turbine engine of claim 16, further comprising a cover plate, wherein the first source is a platform cavity defined between the platform and the cover plate.

19. The gas turbine engine of claim 16, wherein the first source is at an outer diameter location relative to the component, and the second source is at an inner diameter location relative to the component.

20. The gas turbine engine of claim 16, wherein the baffle body has a first end and a second end, wherein the first inlet and the second inlet are located at the first end.

* * * * *